UNITED STATES PATENT OFFICE 2,559,597

HALOMETHYL DERIVATIVES OF DIBENZAN-THRONE, ISODIBENZANTHRONE AND CHLORODIBENZANTHRONE, AND METHOD OF PREPARING THE SAME

Samuel Coffey, Frank Lodge, and James Wardleworth, Blackley, Manchester, England, assignors to Imperial Chemical Industries Limited, a corporation of Great Britain No Drawing. Application May 20, 1947, Serial No. 749,363. In Great Britain May 27, 1946

9 Claims. (Cl. 260—356)

This invention relates to new dyestuff intermediates and more particularly it relates to the manufacture of new dyestuff intermediates derived from dibenzanthrone and isodibenzanthrone.

According to the invention we manufacture new dyestuff intermediates by treating dibenzanthrone or isodibenzanthrone or their derivatives with bromo- or chloro-methylating agents in the presence of suitable condensing agents.

By bromo- or chloro-methylating agents we mean agents known to be capable of replacing the reactive hydrogen atoms of aromatic nuclei by bromomethyl or chloromethyl groups. As such agents there may be mentioned dichlorodimethylether and dibromodimethylether or substances which can give rise to dichloro- or dibromo-dimethyl ether in the reaction mixture, for example paraformaldehyde and hydrogen chloride.

As a suitable condensing agent there may be mentioned concentrated sulphuric acid. Alternatively aluminium chloride may be used as a condensing agent, preferably in the presence of a tertiary base such as for example pyridine. When aluminium chloride is used as condensing agent it is sometimes unnecessary to add hydrogen chloride when chloromethylating with paraformaldehyde.

The products of the reaction are isolated by pouring the reaction mixture into a mixture of ice and water and filtering off the solid which separates.

By the process of the invention one or more bromo- or chloro-methyl groups are introduced into the molecule according to the conditions under which the reaction is carried out.

The invention is illustrated but not limited by the following examples in which the parts are by weight.

Example 1

20 parts of dibenzanthrone are dissolved with stirring in 330 parts of 100% sulphuric acid at 20°–25° C. and 65 parts of dichlorodimethylether are added. The mixture is heated to 60° C. in 1 hour and stirred at 60° C. for 6 hours. The chloromethylated product is precipitated by pouring the reaction mixture into a mixture of ice and water, filtered, washed with cold water and dried. The product so obtained is a dark blue powder and it contains two chloromethyl groups per molecule.

Example 2

20 parts isodibenzanthrone are used in place of the 20 parts dibenzanthrone in Example 1. The product so obtained is a violet powder and it contains two chloromethyl groups per molecule.

Example 3

5 parts of dibenzanthrone are added to 60 parts of concentrated sulphuric acid at 15–20° C. and the mixture is stirred for 30 minutes. 22 parts of dibromodimethylether are then added and the mixture is stirred at this temperature for 16 hours. The reaction mixture is cooled and poured into a mixture of ice and water and the bis-(bromomethyl)-dibenzanthrone is filtered off, washed and dried. The product is a violet-coloured powder.

Example 4

30 parts of aluminium chloride are added to 10 parts of pyridine. The temperature of the mixture rises to 120–130° C. The mixture is cooled to 60° C. and 6.5 parts of dichlorodimethylether are added. 5 parts of dibenzanthrone are then added and the mixture is stirred at 60° C. for 3 hours. The reaction mixture is poured into a mixture of ice and water and the bis-(chloromethyl)-dibenzanthrone is filtered off, washed and dried. The product is similar to that of Example 1.

Example 5

10 parts of tetrachlorodibenzanthrone are dissolved with stirring in 170 parts of 100% sulphuric acid at 15–20° C., 26 parts of dichlorodimethylether are added and the mixture is heated at 60° C. for 18 hours. The dark blue product is isolated as described in Example 1.

Example 6

20 parts of isodibenzanthrone are dissolved in 240 parts of concentrated sulphuric acid at 15–20° C. with stirring. 9 parts of dichlorodimethylether are added, the temperature raised to 60° C. in 1 hour and the mixture stirred at 60° C. for 18 hours. The product is isolated by pouring the reaction mixture into 1600 parts of a mixture of ice water, filtering off and washing thoroughly on the filter with cold water. The residue on the filter is dried at 40–50° C. to give a dark violet powder which is essentially monochloromethyl-isodibenzanthrone.

We claim:
1. New compounds selected from the group con- sisting of chloromethyl substituted and bromomethyl substituted aromatic compounds from the group consisting of dibenzanthrone, isodibenzanthrone and chlorodibenzanthrone.

2. The new compounds: bis-(chloromethyl)-dibenzanthrone.

3. The new compounds: chloromethyl-isodibenzanthrone.

4. The new compounds: bis-(chloromethyl)-isodibenzanthrone.

5. A process for the manufacture of new dyestuff intermediates which comprises treating in the presence of a condensing agent an aromatic compound selected from the group consisting of dibenzanthrone, isodibenzanthrone and chlorodibenzanthrone with a methylating agent capable of replacing the reactive hydrogen atoms of aromatic nuclei with a group selected from the halomethyl group consisting of bromomethyl and chloromethyl.

6. A process as set forth in claim 5 wherein the methylating agent is dichlorodimethyl ether.

7. A process as set forth in claim 5 wherein the methylating agent is dibromodimethyl ether.

8. A process as set forth in claim 5 wherein the methylating agent is paraformaldehyde and hydrogen chloride.

9. A process as set forth in claim 5 wherein the condensing agent is sulphuric acid.

SAMUEL COFFEY.
FRANK LODGE.
JAMES WARDLEWORTH.

REFERENCES CITED

The following references are of record in the file of this patent:

UNITED STATES PATENTS

| Number | Name | Date |
|---|---|---|
| 1,704,983 | Luttringhaus et al. | Mar. 12, 1929 |
| 1,899,579 | Luttringhaus et al. | Feb. 28, 1933 |
| 2,058,606 | Lycan | Oct. 27, 1936 |

FOREIGN PATENTS

| Number | Country | Date |
|---|---|---|
| 562,915 | Germany | Oct. 29, 1932 |

OTHER REFERENCES

Isler, "Jour. prakt. Chem." (2), vol. 80 (1909), pp. 287 and 288.

Fieser et al., "Organic Chemistry" (1944), pp. 656 to 660.